Feb. 3, 1970

R. H. EDELSON 3,493,737

ELECTRONIC RESOLUTION

Filed Aug. 7, 1968

INVENTOR.
ROGER H. EDELSON,
BY
Walter J. Adam
ATTORNEY.

Feb. 3, 1970   R. H. EDELSON   3,493,737
ELECTRONIC RESOLUTION
Filed Aug. 7, 1968   3 Sheets-Sheet 2
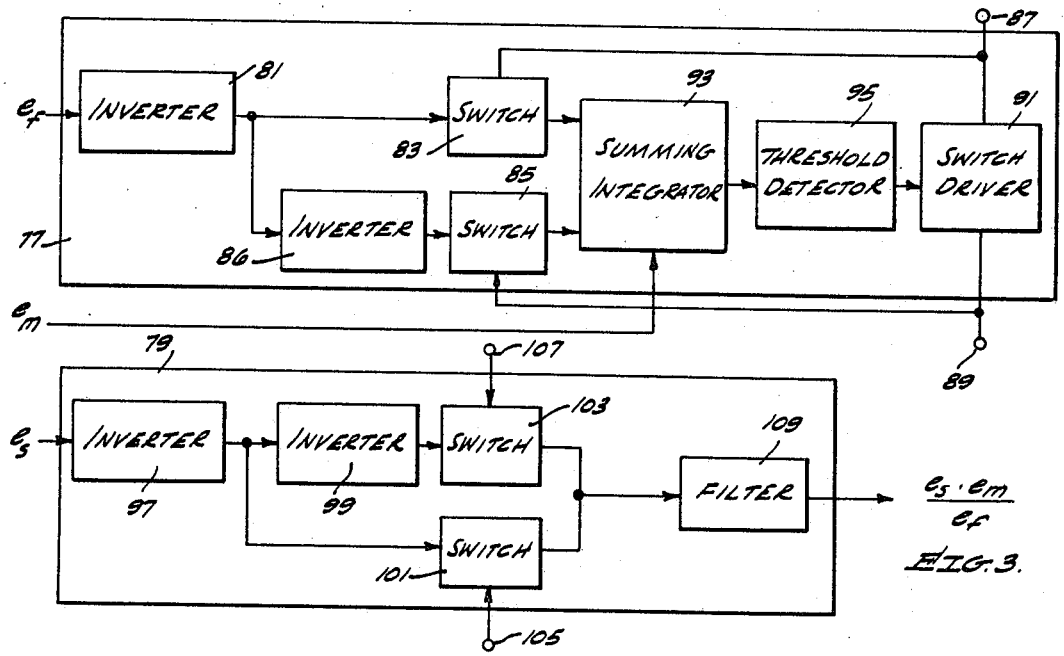
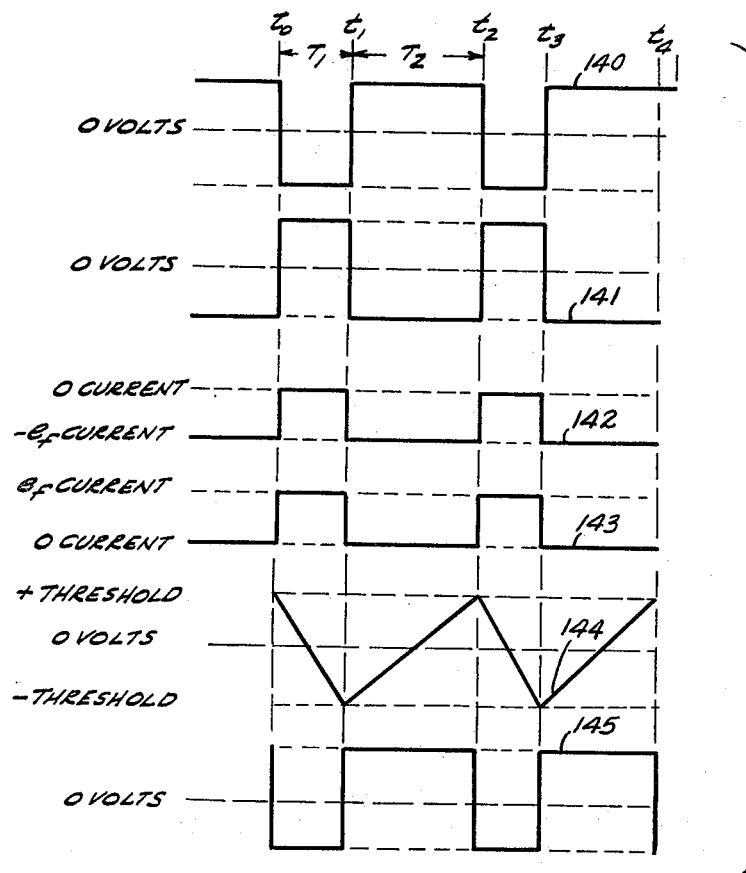
FIG. 3.
FIG. 4.

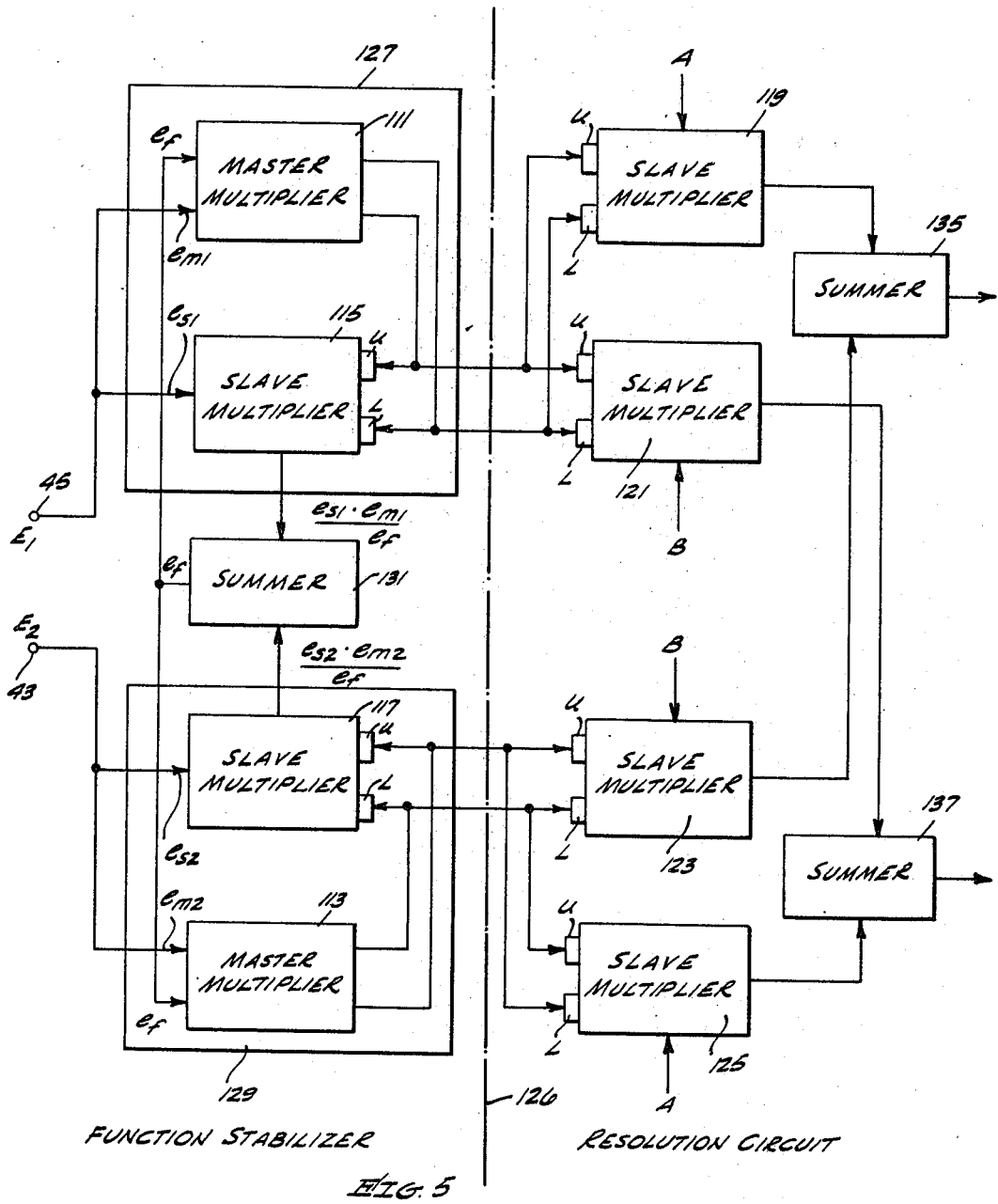

United States Patent Office 3,493,737
Patented Feb. 3, 1970

3,493,737
ELECTRONIC RESOLUTION
Roger H. Edelson, Los Angeles, Calif., assignor to Hughes Aircraft Company, Culver City, Calif., a corporation of Delaware
Filed Aug. 7, 1968, Ser. No. 754,142
Int. Cl. G06g 7/22
U.S. Cl. 235—189                                    9 Claims

ABSTRACT OF THE DISCLOSURE

A system for electronically resolving the components of the angular motion of a shaft wherein demodulated unscaled sine and cosine inputs, containing the angular information are selectively applied to a first portion of a plurality of slave and master-time division multipliers, summed and reapplied to the first portion in order to produce output scaled sine and cosine information. This output scaled sine and cosine information is then respectively combined in a second portion of the plurality of time division multipliers with input voltages which are to be resolved into new vector components according to the angular rotation of the rectangular coordinates caused by the angular motion in order to produce output voltages which respectively vary as a function of the angular rotation of the shaft from the zero or null position.

BACKGROUND OF THE INVENTION

This invention relates to angle resolution systems and particularly to an accurate electronic resolution system.

In navigational and other electronic systems, the resolution of known quantities into a new system of rectangular coordinates due to a change in shaft angular position is well known in the art. There are two principal steps involved in the resolution of quantities.

In the first step, voltages conforming to the sine and cosine functions of the angle of rotation must be produced. These sine and cosine functions may be produced by such devices as nonlinear potentiometers, square-card sine potentiometers, phase-shifting capacitors and resolvers. These mechanical devices are unsatisfactory due to their relative unreliability under continuous operation. A recent development in the field is the use of electronic equipment, rather than mechanical, to provide sine and cosine information of angle position. In all of the above devices a reference voltage is used in the production of these sine and cosine voltages. This reference voltage is multiplied by the desired trignometric function of the angle of rotation. The angle information is therefore contained in the amplitude of each of the sine and cosine voltages. However, in response to any amplitude variations in the reference voltage, due to variations in loading, input signals, temperature, humidity, pressure, etc., the amplitudes of the sine and cosine voltages change. In some systems this reference voltage has been found to vary by large amounts. If a high tolerance voltage regulator were used to produce the reference voltage, loading factors due to the finite circuit impedances would generally cause the sine and cosine voltage information to still differ substantially from the sine and cosine of the angle of rotation by significant amounts. A disadvantage of utilizing a high tolerance voltage regulator to supply the reference voltage is the relatively high power consumption, cost, bulk and weight thereof.

In the second step of resolution, the sine and cosine voltages are combined with the quantities to be resolved in various combinations in order to form signals representing the standard equations for angular resolution. A conventional device used here for angular resolution is a mechanical device such as a synchro resolver. The main disadvantage of the synchro resolver is its relative unreliability with sustained operation. Other disadvantages include power consumption, cost, bulk, weight and the requirement of periodic preventive maintenance.

At the present time electronic or mechanical devices are not known for producing sine and cosine information signals that remain equal to the sine and cosine of an angular rotation in spite of changes in the reference and/or system voltages. Furthermore, systems are not known for electronically resolving quantities from one system of rectangular coordinates into another system of rectangular coordinates without mechanical devices and independently of reference and system voltage changes.

SUMMARY OF THE INVENTION

Briefly, applicant has provided a simple, low-power, lightweight, compact, economical and novel electronic system for relating sine and cosine information, derived from an angular rotation, to a constant reference system independent of line voltage fluctuations and system parameter variations and for electronically resolving components of the angular motion.

It is therefore an object of this invention to provide an improved device for producing accurate sine and cosine information independently of line voltage fluctuations and system parameter variations.

Another object of this invention is to provide an improved resolving device for relating input signals to a constant reference system.

Another object of this invention is to provide an improved electronic resolution system.

Another object of this invention is to provide a system for electronically resolving without moving parts the components of an angular motion.

A further object of this invention is to provide a reliable low-power, lightweight and compact electronic resolver.

BRIEF DESCRIPTION OF THE DRAWINGS

These and other objects, features and advantages of the invention, as well as the invention itself, will become more apparent to those skilled in the art in the light of the following detailed description taken in connection with the accompanying drawings wherein like reference numerals indicate like or corresponding parts throughout the several views wherein:

FIG. 3 is a schematic block diagram of a Master-Slave time division multiplier circuit as utilized in the embodiment of FIG. 5.

FIG. 4 illustrates voltage and current waveforms involved in the operation of the components of FIG. 3.

FIG. 5 is a schematic block diagram of the electronic resolution system in accordance with one embodiment of the invention.

DETAILED DESCRIPTION OF THE PREFERRED EMBODIMENTS

Figure 1:
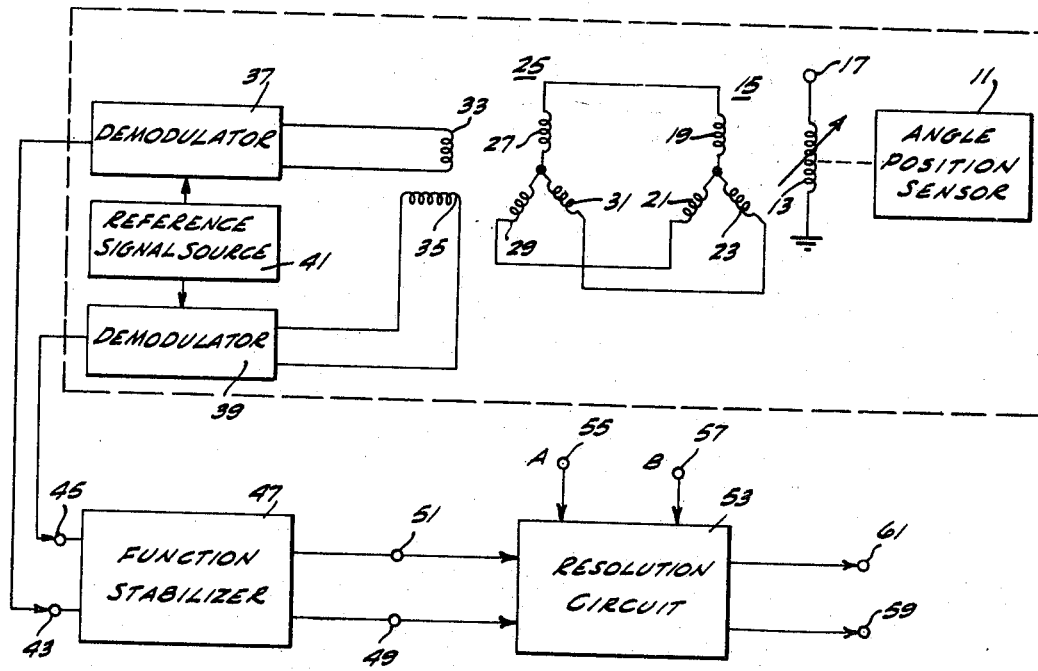
FIG. 1 is a partial schematic circuit and block diagram in accordance with one embodiment of this invention.

Referring now to the drawings, FIG. 1 illustrates in combined circuit and block diagram form one embodiment of this invention. An angle position sensor 11 senses a change in pitch, roll, azimuth, elevation or any change in any desired angular position from a reference position. The angle position sensor is mechanically coupled to the rotor 13 of synchro transmitter 15 in order to move the rotor 13 to any new angular position that it senses. The rotor 13 is electrically coupled between ground and a source 17 of AC (alternating current) reference potential so as to induce voltages into stator windings 19, 21 and 23 of synchro transmitter 15 in accordance with the angular rotation of rotor 13. Locked-rotor control transformer 25 has its stator windings 27, 29 and 31 respectively arranged in parallel-alignment with the stator windings 19, 21 and 23 for maximum voltage reception therefrom. Rotor windings 33 and 35 of control transformer 25 are mounted on a locked rotor (not shown) in orthogonal alignment with each other in order to convert the three-phase synchro input voltages to windings 27, 29 and 31 into quadrature or two-phase signals ninety degrees (90°) out of phase with respect to each other. The resultant voltage inductively coupled from the stator windings 27, 29 and 31 into the rotor winding 33 will henceforth be referred to as the sine voltage since it is directly related to the sine function of the new angular position. Likewise, the resultant voltage inductively coupled from the stator windings 27, 29 and 31 into the rotor winding 35 will henceforth be referred to as the cosine voltage since it is directly related to the cosine function of the new angular position. This conversion from three-phase synchro information into alternating current (AC) sine and cosine voltages can also be accomplished by either a Scott connected transformer or a pair of operational amplifier summers, or adders, with each summer having three input signals appropriately weighted.

The AC (alternating current) sine and cosine voltages from windings 33 and 35 are respectively applied to phase-sensitive demodulators 37 and 39, along with reference signals from a reference signal source 41, in order to convert the AC sine and cosine voltages in DC (direct current) voltages having amplitudes representing the sine and cosine phase information. The operation of these phase sensitive demodulators 37 and 39 are well known to those familiar with the art and will not be further discussed. The outputs of demodulators 37 and 39 are respectively applied to terminals 43 and 45 of a function stabilizer 47 in order to compensate for amplitude changes in the sine and cosine information signals due to changes in the reference voltage from source 17 and/or the effects of load variations on other system components. The demodulated sine and cosine information signals from demodulators 37 and 39 that are respectively applied to terminals 43 and 45 of the function stablizer 47 will henceforth be referred to as the unscaled sine and cosine information signals due to the fact that the sine and cosine information signals may contain an undesired factor derived from these reference and/or system voltage changes.

The use of unscaled sine and cosine information signals is an extremely important consideration in the resolution of scalar quantities from one system of rectangular coordinates into another system of rectangular coordinates. The new projection of a vector in a spatial coordinate system basically involves the rotation of rectangular coordinates about a third axis. This projection can give an erroneous spatial transformation with the use of unscaled sine and cosine information signals unless the system compensates for the effects produced by the reference and/or system voltage changes. The function stabilizer 47 solves this problem by effectively cancelling these voltage changes, so that the sine and cosine information signals respectively appearing at the output terminals 49 and 51 of the function stabilizer 47 are completely independent of reference and/or system voltage changes and, therefore, are scaled to a reference level that is dependent only upon the angular rotation of the rotor 13. These scaled sine and cosine information signals of the new angle of rotation are applied to the resolution circuit 53. In addition, scalar quantities A and B, generally representing vector components which may be signals from another part of the system that are to be resolved through the new angle of rotation, are respectively applied to terminals 55 and 57 of the resolution circuit 53. The scaled sine and cosine information from the function stabilizer 47 is combined in the resolution circuit 53 with the A and B signals to form at the output terminals 59 and 61 the standard outputs for angular resolution, or the linear transformation that corresponds to the rotation of rectangular coordinates, namely, $$X = A \cos \theta + B \sin \theta$$

and $$Y = B \cos \theta - A \sin \theta$$

where $\theta$ is equal to the new angle of rotation, or the angle through which the axes are rotated, and where, as an illustrative example, A and B may represent pitch, roll, angle, rate, velocity, acceleration or position information signals, in the form of voltages, that are required to be referenced back into an X and Y system of rectangular coordinates.

To further explain the rotation of rectangular coordinates, consider an X–Y reference coordinate system and an A–B coordinate system where both systems have a common Z-axis. Upon the rotation of the A–B coordinate system around the common Z-axis such that the A-axis is displayed from the X-axis by the angle $\theta$, a measurement is made to a point located at a distance A along the A-axis and at a distance B along the B-axis. The system of the invention electronically transforms the coordinates of the measured point from the A–B coordinate system to the X–Y reference coordinate system with a high degree of accuracy. Thus the resolution of the A and B quantities into the X–Y reference coordinate system is given by the equation $$X = A \cos \theta + B \sin \theta$$
$$Y = B \cos \theta - A \sin \theta$$

A detailed analysis of the rotation of rectangular coordinates may be found in volume 21 of the "Radiation Laboratory Series," (McGraw-Hill, 1948) on pages 157–160.

It should be noted at this point that the three phase angle information from the synchro transmitter 15 is applied to a completely electronic resolution system which has no moving or mechanical parts. The absence of mechanical parts greatly increases the reliability of the resolution system and also decrease the size and cost of the system.

Figure 2:
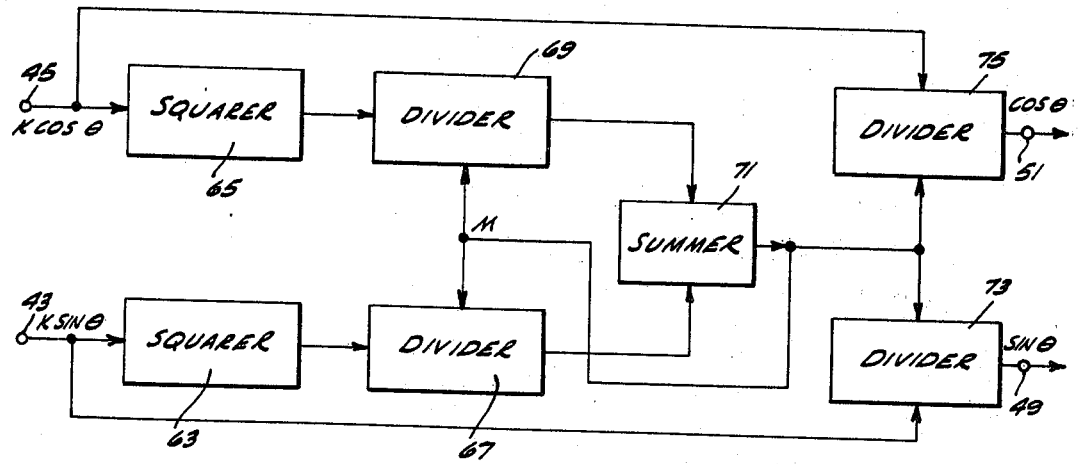
FIG. 2 is a schematic block diagram of the mathematical mechanization of the Function Stabilizer of FIG. 1.

FIG. 2 illustrates in schematic block diagram form the mathematical mechanization of the function stabilizer 47 of FIG. 1. As stated before, the function stabilizer 47 converts unscaled sine and cosine information signals into scaled sine and cosine information signals by effectively cancelling the reference and/or system voltage changes. To illustrate how this is accomplished, let K = the ratio of the unscaled sine (or cosine) information to the scaled sine (or cosine) information wherein the deviation of the unscaled signal from the scaled signal is caused by the reference and/or system voltage changes at any given time.

This fraction of change, K, will therefore be felt at the input terminals 43 and 45 of the function stabilizer 47 as $K \sin \theta$ and $K \cos \theta$, respectively. The $K \sin \theta$ and $K \cos \theta$ inputs are respectively applied to squarers 63 and 65 which multiply the respective inputs by themselves. The $K^2 \sin^2 \theta$ and $K^2 \cos^2 \theta$ outputs of squares 63 and 65 are respectively applied to dividers 67 and 69. A summer, or adder, 71 is coupled between dividers 67 and 69 in order to add or sum the outputs therefrom. The output of summer 71, which at this time will be designated as M, is fed back to a common input to the dividers 67 and 69 and will function as a divisor of the other inputs. The outputs of dividers 67 and 69 are now $$K^2 \sin^2 \theta / M$$

and $$K^2 \cos^2 \theta / M$$

respectively, and are applied to the summer 71 as inputs. The sum of the inputs to summer 71 is equal to the output of summer 71 which is expressed by the equation $$\frac{K^2 \sin^2 \theta}{M} + \frac{K^2 \cos^2 \theta}{M} = M$$

since we originally defined the output of summer 71 as M.

Factoring out the $K^2/M$ factor from the left hand terms and multiplying both sides of the equation by M, the equation now becomes $$K^2 (\sin^2 \theta + \cos^2 \theta) = M^2$$

Since $\sin^2 \theta + \cos^2 \theta = 1$, $$K^2 = M^2$$

or $$K = M$$

Therefore, the output of summer 71 is equal to K. The summer 71 is coupled to a common input of dividers 73 and 75 in order to provide the K factor as a divisor thereto. The $K \sin \theta$ and $K \cos \theta$ inputs at input terminals 43 and 45 are applied as dividends to dividers 73 and 75, respectively. The outputs of dividers 73 and 75 are $\sin \theta$ and $\cos \theta$ respectively, with the K factor being cancelled from each. These $\sin \theta$ and $\cos \theta$ outputs are thus independent of any reference and/or system voltage changes, from which the K factor was derived, and are therefore scaled outputs.

Although the scaled $\sin \theta$ and $\cos \theta$ outputs can be derived by the purely mathematical mechanization, as shown and explained in connection with FIG. 2, other circuit arrangements may be utilized in accordance with the invention. It has been found to be more advantageous to produce these sine and cosine functions by the use of time-division multiplier circuits, due to cost and size considerations, because the separation of a time division multiplier into Master and Slave multiplier portions (to be described later) permits the production of these scaled sine and cosine functions and the subsequent resolution of other quantities to be performed without the repetitious use of the Master Multiplier portion with each Slave Multiplier portion. A time-division multiplier basically depends upon the combined pulse-amplitude and pulse-width modulation of a rectangular pulse train. The circuit operation of different types of time-division multipliers is explained in the book "Electronic Analog and Hybrid Computers," Korn and Korn (McGraw-Hill 1964) from page 268 to page 281. The time-division multiplier, as used by applicant, may be like that shown in FIG. 7–15 on page 273 of the above-referenced book, since applicant has separated his time division multiplier into two portions, wherein the Slave multiplier portion is comparable to the upper "electronic switch" and the "output amplifier and ripple filter" of Fig. 7–15 and the Master multiplier portion is comparable to the remaining components of Fig. 7–15. This separation was effected in order to obtain advantages of cost, size and reliability, as previously mentioned, when it is required to resolve many signals by the same angle. In this case it is only necessary to provide Slave multiplier portions since the Master multiplier portion can drive many Slave multiplier portions. The use and operation of time-division multipliers will now be explained in relation to FIGS. 3, 4, and 5.

Referring now to FIG. 3, a block diagram of a Master-Slave time-division multiplier is shown as utilized in the embodiment of FIG. 5. The time-division multiplier is comprised of the master multiplier 77 and the slave multiplier 79 although additional slave multipliers could be utilized. Direct current (DC) input voltages, $e_f$, $e_m$, and $e_s$ are applied to the time-division multiplier. The $e_f$ pulse is applied to an inverter 81 which is coupled directly to a switch 83 and also to a switch 85 through an inverter 86 in order to respectively provide opposite polarity pulses to switches 83 and 85. The inverter 81 adjusts the gain of the $-e_f$ signal that is applied to the switch 83, while the inverter 86 adjusts the gain of the $e_f$ signal that is applied to the switch 85. If a system gain of one is desired, the inverters 81 and 86 are adjusted so that the inputs to switches 83 and 85 have a unity gain in relation to the amplitude of the $e_f$ input to the time-division multiplier. Furthermore, with a unity system gain, the $e_f$ input must be larger than the $e_m$ input for proper operation.

Opposite polarity gating signals from terminals 87 and 89 of a switch driver 91 are selectively applied to the switches 83 and 85 in order to allow sequential operation of the respective switches. A summing integrator 93 is coupled between the switches 83 and 85 and also to the source of the $e_m$ pulse in order to sum or integrate the currents produced by the $e_m$ signal and the $-e_f$ and $e_f$ signals from the respective switches 83 and 85. A threshold detector 95 is coupled between the summing integrator 93 and the switch driver 91 and is responsive to each threshold level change from the summing integrator 93 to cause the switch driver 91 to switch the polarity of its opposite polarity gating signals at the terminals 87 and 89. The gating signal outputs at terminals 87 and 89 are in duty cycle form (ratio of on-time to the sum of on-time and off-time) and are respectively switched from $e_m/e_f$ and $-e_m/e_f$ to $-e_m/e_f$ and $e_m/e_f$ and then back to $e_m/e_f$ and $-e_m/e_f$.

The interconnection and operation of inverters 97 and 99 and switches 101 and 103 of the slave multiplier 79 are identical to those of the inverters 81 and 87 and the switches 83 and 85 respectively of the master multiplier 77. However, the input to inverter 97 is the $e_s$ pulse. Switches 101 and 103 are respectively coupled to terminals 89 and 87 of the master multiplier 77 via gate terminals 105 and 107 of the slave multiplier 79 to permit switches 101 and 103 to alternate in operation according to the threshold level that is being detected by detector 95. The output circuits of switches 101 and 103 are coupled together and to the averaging filter 109 in order to produce a filtered output product equal to $$\frac{e_s \cdot e_m}{e_f}$$

Basically, the master multiplier 77 divides the quantity $e_m$ by the quantity $e_f$ to provide a quotient equal to $e_m/e_f$, while the slave multiplier 79 multiplies that quotient by the quantity $e_s$ to produce a product equal to $$\frac{e_s \cdot e_m}{e_f}$$

The operation of the Master-Slave time-division multiplier of FIG. 3 can best be understood by referring to the waveforms of FIG. 4 where waveforms 140 and 141 illustrate the gating voltage outputs of the switch driver 91 at the terminals 87 and 89 respectively; waveforms 142 and 143 illustrate the respective output current waveforms from switches 83 and 85; waveform 144 illustrates the output voltage waveform of the summing integrator 93; and waveform 145 illustrates the output voltage waveform of the threshold detector 95. All of the waveforms of FIG. 4 are correlated to the specific times of $t_0$, $t_1$, $t_2$, $t_3$ and $t_4$ with the period $T_1$ equal to $t_1-t_0$ and the period $T_2$ equal to $t_2-t_1$.

At time $t_0$ the gating signal at terminal 87 goes negative and gates switch 83 to the "off" or nonconducting condition, while the gating signal at terminal 89 goes positive and gates switch 85 to the "on" or conducting condition, as shown in waveforms 140 and 141. For the duration of the $T_1$ period switch 83 remains "off" and switch 85 remains "on." During this $T_1$ period the summing integrator 93 is charged by the $e_f$ current from switch 85 (waveform 143) and by the $e_m$ current (not shown), and produces the negative-going ramp voltage as shown in waveform 144. There is no $-e_f$ charging current from switch 83 during the $T_1$ period. When the negative-going ramp voltage reaches a negative (−) threshold level at time $t_1$, the threshold detector 95 responds by changing its output from a negative to a positive voltage. The switch driver 91 reacts to this positive output voltage from the detector 95 by reversing the polarity of its gating signals at terminals 87 and 89.

At time $t_1$, therefore, the gating signal at terminal 87 goes positive and gates switch 83 to the "on" or conducting condition, while the gating signal at terminal 89 goes negative and gates switch 85 to the "off" or nonconducting condition. For the duration of the $T_2$ period switch 83 remains "on" and switch 85 remains "off." During this $T_2$ period the summing integrator 93 is charged from the negative (−) threshold level toward the positive (+) threshold level by the $-e_f$ current from switch 83 (waveform 142) and by the $e_m$ current, and produces the positive-going ramp voltage as shown in waveform 144. There is no $e_f$ charging current from switch 85 during the $T_2$ period. When the positive-going ramp voltage reaches the positive (+) threshold level at time $t_2$, the threshold detector responds by changing its output from a positive to a negative voltage. The switch driver 91 reacts to this negative output voltage from the detector 95 by reversing the polarity of its gating signals at the terminals 87 and 89.

From this point on in time the circuit operation of FIG. 3 repeats, since the time interval $t_3-t_2$ is identical with $T_1$ and the time interval $t_4-t_3$ is identical with $T_2$.

Upon further analysis of the waveforms 140 through 145 of FIG. 4, the master multiplier 77, or time-division portion of the time-division multiplier of FIG. 3, carries its division information ($e_m/e_f$) in the form of a duty cycle. The duty cycle can be defined as the ratio of "on" time to total time $(T_1+T_2)$. It should be recalled that there are three charging currents being applied to the summing integrator 93 during this "total cycle time" $(T_1+T_2)$. The $e_m$ current is applied during the $T_1+T_2$ periods, while the $e_f$ current from the switch 85 is only applied during the $T_1$ period (waveform 143) and the $-e_f$ current from the switch 83 is only applied during the $T_2$ period (waveform 142). The average value of the charging currents applied to the summing integrator is therefore given by the equation:

$$\frac{e_m}{R_1}(T_2+T_1)+\frac{e_f}{R_2}(T_1)+\frac{(-e_f)(T_2)}{R_3}=0$$

with $R_1$, $R_2$, and $R_3$ being various circuit resistances (not shown) which help control the system gain. For example, the summing integrator 93 may contain an operational amplifier (not shown) in which $R_1$, $R_2$ and $R_3$ are the input resistances, each being responsive to its respective one of the input signals $e_m$, $e_f$ and $-e_f$ and connected to a common summing point. When the master multiplier 77 and its components are designed for a system gain of one, $R_1=R_2=R_3$ and the equation then becomes $$e_m(T_2+T_1)+e_f(T_1)+(-e_f)(T_2)=0$$

Dividing all the terms of the equation by $e_f$ $(T_2+T_1)$ combining like terms, and transposing terms, the resulting expression then becomes:

$$\frac{e_m}{e_f}=\frac{T_2-T_1}{T_2+T_1}$$

It has therefore been proven that the quotient $e_m/e_f$ is obtained by pulse width modulation and is contained in the duty cycle form of $$\frac{T_2-T_1}{T_2+T_1}$$

The multiplication by the time-division multiplier is accomplished in the slave multiplier 79 by applying the just derived duty cycle and the negation thereof selectively to the switches 101 and 103 via the terminals 105 and 107, while applying the $-e_s$ signal to switch 101 $e_s$ signal to switch 103.

Since the switch 103 is only gated on during the $T_2$ portion of the total time $(T_1+T_2)$, as shown in waveform 140, $e_s$ current only flows through the switch 103 to the filter 109 during the $T_2$ period. Also, since the switch 101 is only gated on during the $T_1$ portion of the total time $(T_1+T_2)$, as shown in waveform 141, $-e_s$ current only flows through the switch 101 to the filter 109 during the $T_1$ period. If the system gain of the slave multiplier 79 is equal to one and the output signal of filter 109 is represented by $e_o$, then the flow of $e_s$ and $-e_s$ currents can be represented by the equation $$e_o=(e_s)\frac{T_2}{T_2+T_1}+(-e_s)\frac{T_1}{T_2+T_1}$$

Factoring out the quantity $e_s$ from the righthand terms and combining terms, the equation becomes $$e_o=e_s\left[\frac{(T_2-T_1)}{(T_2+T_1)}\right]$$

with the substitution of $$\frac{T_2-T_1}{T_2+T_1}$$

by its equality of $e_m/e_f$, the resulting equation becomes $$e_o=\frac{e_s \cdot e_m}{e_f}$$

The operation of a time-division multiplier in accordance with the invention has now been shown.

FIG. 5 illustrates in block diagram form an electronic resolution system in accordance with one embodiment of the invention. Everything to the left of a line 126 may represent the function stabilizer 47 of FIG. 1, while everything to the right of the line 126 may represent the resolution circuit 53 of FIG. 1. Master multipliers 111 and 113 and slave multipliers 115, 117, 119, 121, 123 and 125 are respectively identical in structure and operation to the master multiplier 77 and the slave multiplier 79 of FIG. 3. Therefore, the structure, connections and operation of each of time division multipliers 127a and 129 are identical to those explained in relation to the circuitry of FIG. 3.

Terminal 45 is parallel-connected to input circuits of master multiplier 111 and slave multiplier 115 so that equal signals can be applied to both inputs. Terminal 43 is parallel-connected to input circuits of master multiplier 113 and slave multiplier 117 for the same reason. A summer, or adder, 131 is coupled between the output circuits of slave multipers 115 and 117 in order to apply the sum of the output signals therefrom as signal $e_f$ to second input circuits of master multipliers 111 and 113. The positive and negative duty cycle outputs from master multiplier 111 are coupled to U and L input terminals, respectively, of slave multipliers 115, 119 and 121 in order to obtain positive polarity outputs from these slave multipliers. These U and L input terminals are shown in FIG. 3 as the gate terminals 107 and 105, respectively, of the slave multiplier 79. It should also be noted that each pair of positive and negative duty cycle output lines from each of master multipliers 111 and 113 to its respective slave multiplier U and L input terminals is represented in FIG. 1 as a single line from terminals 51 and 49, respectively, to the resolution circuit 53. The positive and negative duty cycle outputs from master multiplier 113 are coupled to the U and L input terminals, respectively, of slave multipliers 117 and 123 so that these slave multipliers will produce positive polarity outputs. These same positive and negative duty cycle outputs from the master multiplier 113 are also coupled to the L and U input terminals, respectively, of slave multiplier 125 in order to produce a negative polarity output therefrom.

A and B signals, which are DC (direct current) signals to be resolved, are not introduced into the system, with the A signal being applied to input circuits of slave multipliers 119 and 125 and the B signal being applied to slave multipliers 121 and 123. Each of the slave multipliers 119, 121, 123 and 125 produces a product of its respective inputs, with the polarity of the product being determined, as previously discussed, by how its U and L input terminals are connected to its respective master multiplier. A summer 135 is coupled between the output circuits of the slave multipliers 119 and 123, and a summer 137 is coupled between the output circuits of slave multipliers 121 and 125. The summers 135 and 137 each provide an output signal representative of the sum of the amplitude of its input signals.

In operation, an $E_1$ signal is applied to terminal 45 and an $E_2$ signal is applied to terminal 43. To aid in the understanding of the operation of the circuitry of FIG. 5, the following list of symbol definitions is now given:

$E_1$ = the signal applied to terminal 45.
$E_2$ = the signal applied to terminal 43.
$e_{m_1}$ = the $E_1$ signal that is applied to one input circuit of master multiplier 111.
$e_{s_1}$ = the $E_1$ signal that is applied to an input circuit of slave multipiler 115.
$e_{m_2}$ = the $E_2$ signal that is applied to one input circuit of master multiplier 113.
$e_{s_2}$ = the $E_2$ signal that is applied to an input circuit of slave multiplier 117.
$e_f$ = the output of summer 131 applied as a second input signal to each of master multipliers 111 and 113.
$\pm e_{m_1}/e_f$ = the positive and negative duty cycle outputs of master multiplier 111.
$\pm e_{m_2}/e_f$ = the positive and negative duty cycle outputs of master multiplier 113.

$\dfrac{e_{s_1} \cdot e_{m_1}}{e_f}$ = the output of slave multiplier 115.

$\dfrac{e_{s_2} \cdot e_{m_2}}{e_f}$ = the output of slave multiplier 117.

$A \cdot \dfrac{e_{m_1}}{e_f}$ = the output of slave multiplier 119.

$B \cdot \dfrac{e_{m_1}}{e_f}$ = the output of slave multiplier 121.

$B \cdot \dfrac{e_{m_2}}{e_f}$ = the output of slave multiplier 123.

$-A \cdot \dfrac{e_{m_2}}{e_f}$ = the output of slave multiplier 125.

$A \cdot \dfrac{e_{m_1}}{e_f} + B \cdot \dfrac{e_{m_2}}{e_f}$ = the output of summer 135.

$B \cdot \dfrac{e_{m_1}}{e_f} - A \cdot \dfrac{e_{m_2}}{e_f}$ = the output of summer 137.

The derivation or the method for deriving each of the above quantities was discussed in relation to FIGS. 3 and 4 and thus should be obvious to those familiar with the art. They will therefore not be proved again.

When the circuit of FIG. 5 is used as an angle resolver and subject to reference voltage and/or system parameter changes which effect the amplitude of the sine and cosine information signals that are respectively applied to terminals 43 and 45, $E_1 = K \cos \theta$ (DC), and $E_2 = K \sin \theta$ (DC). The K factor has already been defined in relation to the circuit of FIG. 2. Also, it should be remembered that the cosine and sine voltages at this point are in the from of DC (direct current) voltages which retain the phase information in their respective amplitudes. Since $e_{s_1} = e_{m_1} = E_1 = K \cos \theta$, the output of the slave multiplier 115 is equal to $$\frac{K^2 \cos^2 \theta}{e_f}$$

Since $e_{s_2} = e_{m_2} = E_2 = K \cos \theta$, the output of the slave multiplier 117 is equal to $$\frac{K^2 \sin^2 \theta}{e_f}$$

Due to the fact that the output of summer 131 has been defined as $e_f$, the relationship between the input and output signals of the summer 131 can be expressed by the equation $$\frac{K^2 \sin^2 \theta}{e_f} + \frac{K^2 \cos^2 \theta}{e_f} = e_f$$

Factoring out the $K^2$ factor from the left hand terms and multiplying both sides of the equation by $e_f$, the equation now becomes $K^2 (\sin^2 \theta + \cos^2 \theta) = e_f^2$. Since the quantity $\sin^2 \theta + \cos^2 \theta = 1$ $K^2 = e_f^2$ and
$K = e_f$ Since the master multipliers 111 and 113 each perform division operations on their respective input signals, it is obvious that the output signals therefrom are $\cos \theta$ and $\sin \theta$, respectively. It has therefore been shown that these $\cos \theta$ and $\sin \theta$ signals are independent of reference voltage changes and any other system parameter changes. The system of the function stabilizer 47 therefore performs a normalizing operation by returning the sine and cosine signals to a constant reference so that only the change in the angle of rotation will produce amplitude changes in the sine and cosine signals.

The resolution of the A and B quantities from the A–B coordinate system back into the X–Y reference coordinate system is accomplished by applying the paired cosine information signals to the U and L terminals of each of slave multipliers 119 and 121, the paired sine formation signals to the U and L terminals of slave multiplier 123 and to the L and U terminals of slave multiplier 125 respectively, the A signals to input circuits of slave multipliers 119 and 125, and the B signals to input circuits of slave multipliers 121 and 123.

Upon consulting with the given list of symbol definitions it should now be obvious that the outputs of summers 135 and 137 are respectively $A \cos \theta + B \sin \theta$ and $B \cos \theta - A \sin \theta$, which defines the respective values of the X and Y coordinates after the coordinate transformation.

The invention thus provides an electronic resolver which includes a circuit for returning, or normalizing, unscaled sine and cosine signals to a constant reference system so that the scaled sine and cosine output signals only vary as a function of an angle of rotation and are independent of any variable system parameters. These scaled sine and cosine signals are then selectively combined with at least one pair of quantities to be resolved back into a reference system of rectangular coordinates by the angle of rotation.

What is claimed is:
1. A resolving system comprising:
    circuit means for receiving first and second quadrature signals representing an angular position;
    stabilizing means coupled to said circuit means for providing stabilized first and second quadrature signals each having an amplitude that varies substantially only with the angular position;
    signal means for receiving a plurality of input signals to be resolved according to the angular position; and
    resolving means coupled between said stabilizing means and said signal means for providing a plurality of resolved output signals.
2. The structure of claim 1 further including:
    means coupled to said circuit means for converting three phase signal information representative of the angular position into the first and second quadrature signals.

3. A system for converting unscaled sine and cosine signal information containing an undesired voltage factor due to a change in system parameters into scaled sine and cosine signal information independent of the undesired voltage factor and respectively a function of the sine and cosine functions, including in combination:

first and second signal circuits, each of said signal circuits having first, second and third terminals and at least one output terminal, said output terminals of said first and second signal circuits respectively supplying the scaled sine and cosine information independent of the undesired voltage factor;

means coupled to said first terminals of said first and second signal circuits for respectively receiving the unscaled sine and cosine signal information containing the undesired voltage factor; and summing means coupled between each of said third terminals for reception of signals therefrom, said summing means further coupled to each of said second terminals for applying a summed output signal thereto.

4. The structure of claim 3 wherein each of said first and second signal circuits further includes:

a master circuit having said first, second and output terminals;

a slave circuit having said third terminal, and further including fourth and fifth terminals respectively coupled to said output and first terminals.

5. The structure of claim 4 wherein each of said first and second signal circuits is a time division multiplier and the scaled sine or cosine signal information is in the form of a duty cycle.

6. An electronic system for factoring out a factor common to two products including in combination:

first and second dividing means for producing respective output quotients;

first and second multiplying means for producing respective output products;

first and second multiplying means for producing respective output products;

summing means for producing an output sum of the input signals thereto;

each of said dividing and multiplying means having a first input terminal, each of said dividing means further having a second input terminal;

means for receiving a first product of first and second factors coupled to said first input terminals of said first dividing means and said first multiplying means;

means for receiving a second product of first and third factors coupled to said first input terminals of said second dividing means and said second multiplying means;

said summing means coupled between said first and second multiplying means for summing the respective output products therefrom, said summing means further coupled to said second input terminal of each of said dividing means for applying the first factor thereto;

first means for coupling the output quotient of said first dividing means to said first multiplying means, said first dividing means being responsive to the inputs of the first product and the first factor to produce an output equal to the second factor;

second means for coupling the ouptut quotient of said second dividing means to said second multiplying means, said second dividing means being responsive to the input of the second product and the first factor to produce an output equal to the third factor;

said first multiplying means being responsive to the inputs of the first product and the second factor to produce the product thereof; and said second multiplying means being responsive to the inputs of the second product and the third factor to produce the product thereof.

7. The structure of claim 6 being a system for stabilizing sine and cosine information signals derived from an angular rotation so that the outputs of the system only vary as the sine and cosine of the angular rotation, wherein:

the first factor is an undesired voltage factor produced by a change in system parameters, the second factor is a direct current voltage having an amplitude related to the cosine of the angular rotation, and the third factor is a direct current voltage having an amplitude related to the sine of the angular rotation.

8. A resolving system responsive to first and second angle information signals and to first and second amplitude information signals, the amplitude information signals representing amplitude data of a predetemined angular rotation so that the outputs of the system only angular parameter at angles defined by the angle information signals relative to a selected reference system comprising:

function stabilizing means responsive to the first and second signals for developing first and second stabilized signals representing the information with said undesired factor cancelled; and resolution means coupled to said function stabilizing means, said resolution means responsive to the first and second stabilized signals and to the first and second amplitude information signals to develop signals representing the amplitude data relative to the selected reference system.

9. A system for removing an undesired voltage factor comprising:

first, second, third and fourth dividing circuits;

first and second squaring circuits coupled to said first and second dividing circuits respectively;

a summing circuit coupled between said first and second dividing circuits for summing the received signals therefrom and producing the undesired voltage factor, said summing circuit further coupled to each of said first, second, third and fourth dividing circuits for applying the undesired voltage factor thereto;

first means for receiving a first signal containing a sine information signal and an undesired voltage factor coupled to said first squarer and said third divided;

second means for receiving a second signal containing a cosine information signal and an undesired voltage factor coupled to said second squarer and said fourth divider;

said first and second squaring circuits responsive to the reception of the first and second signals to produce output signals equal to the squares of the first and second signals respectively, said first dividing circuit responsive to the reception of the squared first signal and the undesired voltage factor to produce an output signal equal to the squared first signal divided by the undesired voltage factor, said second dividing circuit responsive to the reception of the squared second signal and the undesired voltage factor to produce an output signal equal to the squared second signal divided by the undesired voltage factor, said third dividing circuit responsive to the reception of the first signal and the undesired voltage factor for producing the sine information, said fourth dividing circuit responsive to the reception of the second signal and the undesired voltage factor for producing the cosine information.

References Cited

UNITED STATES PATENTS 3,155,824  11/1964  Rotier _____ 235—189

RODNEY D. BENNETT, Jr., Primary Examiner

C. E. WANDS, Assistant Examiner

PO-1050
(5/69)

UNITED STATES PATENT OFFICE
CERTIFICATE OF CORRECTION

Patent No. 3,493,737        Dated February 3, 1970

Inventor(s) Roger H. Edelson

It is certified that error appears in the above-identified patent and that said Letters Patent are hereby corrected as shown below:

Column 4, line 24, "displaced" instead of "displayed".

Column 7, line 33, "$(e_m/e_f)$" instead of "$(e_m/ef)$".

Column 8, line 18, "$e_o = (e_s) \frac{T_2}{T_2 + T_1} +$ " instead of

"$e_o = (e_s) \frac{T_2}{T_2 + T^1} +$ ".

Column 9, line 3, "now" instead of "not".

Column 9, line 26, "multiplier" instead of "multipiler".

Column 10, line 38, "information" instead of "formation".

Column 11, line 64, "output" instead of "ouptut".

Column 12, line 15, "predetermined" instead of "predetemined".

Column 12, line 16, delete in its entirety.

Column 12, line 43, "divider" instead of "divided".

SIGNED AND
SEALED
JAN 5 1971

(SEAL)
Attest:

Edward M. Fletcher, Jr.
Attesting Officer

WILLIAM E. SCHUYLER, JR.
Commissioner of Patents